3,451,299
CUTTING PRESS WITH WORK FEED MEANS
Frederick A. Pretty and Thomas Gibbard, Leicester, England, assignors to USM Corporation, Flemington, N.J., a corporation of New Jersey
Filed June 26, 1967, Ser. No. 648,829
Claims priority, application Great Britain, July 2, 1966, 29,813/66
Int. Cl. B26d 5/20, 5/08, 7/06
U.S. Cl. 83—263                                           4 Claims

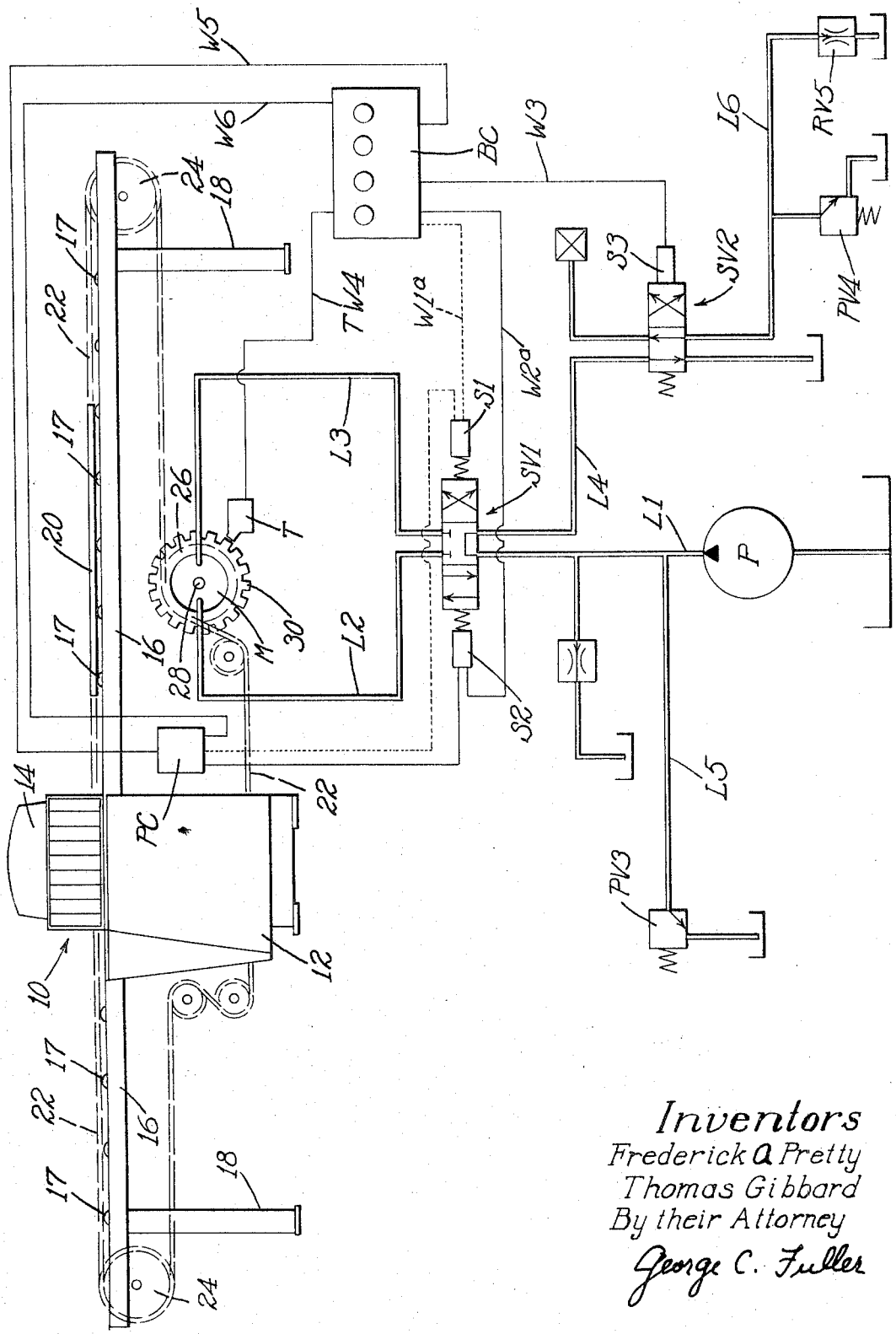

ABSTRACT OF THE DISCLOSURE

A cutting press for sheet material is provided with work feed means comprising a feed table movable horizontally through the press, a driven shaft for moving the table and control means to index the feed table including a toothed wheel on the drive shaft. A tooth detector is responsive to passage of teeth of the wheel past a predetermined position and operates with means responsive to a predetermined tooth count for interrupting the movement of feed table.

BACKGROUND OF THE INVENTION

Field of the invention

This invention relates to improvements in the cutting of sheet material and more particularly it relates to improvements in means for feeding sheet material progressively through a cutting press.

Description of the prior art

Heretofore, it has been known to feed sheet material progressively through a cutting press on a feed table supported for horizontal movement to index the work through a press. Various means have been proposed for controlling the feed table to carry predetermined lengths of sheet material into and through the press. In certain types of cutting in which it is desirable to control the length of the feed steps, dies are superimposed upon the sheet material before moving into a press. In other cases, such as in the operation of the press by which the present invention is illustrated, the upper platen of the press carries a cutting die. It will be appreciated that in order to minimize wastage of sheet material, the indexing thereof must be accomplished with the highest possible accuracy. Known means of controlling the feed table movement leaves something to be desired in this respect.

SUMMARY OF THE INVENTION

It is an object of the present invention to provide in cutting apparatus comprising a cutting press, means for feeding sheet material progressively to said cutting press in which the length of the feed steps may be accurately controlled to minimize wastage.

To this end and in accordance with a feature of the present invention apparatus is provided for feeding sheet material to a cutting press comprising a feed table associated with the press and movable horizontally to carry the material through the press. Power means comprising a drive shaft connected to the table is controlled by means comprising a toothed wheel and cooperative tooth detecting means responsive to the passage of teeth past a predetermined position for controlling the power means in accordance with the number of teeth which have passed the position for interrupting the feeding movement at a predetermined number corresponding to the desired length of the feed step. Suitably, the control means comprises means operative to slow the feed speed to a creep speed after the passage of a given number (less than said predetermined number) of teeth and operative after the passage of said predetermined number of teeth to cause the power means to interrupt further movement of the feed table.

It is a further object of the present invention to provide means to coordinate the operation of accurate means for feeding sheet material stepwise to a cutting press with operation of the cutting press in cutting strokes to minimize the amount of attention required by an operator in high production cutting.

To these ends and in accordance with a further feature of the present invention, the control means for the above described feed means is connected with the power means for operating the cutting press for automatic control thereof to initiate cutting strokes in coordination with said steps of the feeding apparatus. Thus the control means is operative in response to passage of said predetermined number of teeth past the detecting means not only to interrupt the feed movement but also to initiate a stroke of the cutting press. Advantageously and as illustrated, the control also operates responsively to means for detecting the return of the press beam to its rest position for initiating the next feed step.

BRIEF DESCRIPTION OF THE DRAWING

The invention will be described further in connection with the attached drawing in which the figure is a diagrammatic representation of apparatus embodying the present invention and showing hydraulic and electric circuits thereof.

DESCRIPTION OF THE PREFERRED EMBODIMENTS

The invention will be described in relation to a press of the type disclosed in United States Letters Patent No. D. 198,995. The illustrative embodiment includes a hydraulically operated press 10 comprising a frame 12 in which is mounted a stationary bed (not shown, constituting a lower platen of the press) and a beam 14 (constituting the upper platen) movable toward and away from the bed and provided with means (not shown) for supporting a die thereon. It will be appreciated however that the invention is not limited to presses of this specific type.

Extending from both sides of the press 10 is a frame 16 (forming part of the illustrative work feed mechanism) supported on legs 18 and having an upper supporting surface, provided by a plurality of rollers 17 along which a work table 20 is moveable towards and away from the press 10. The work table 20 is connected at opposite ends to opposite ends of a chain 22 which passes over sprockets 24 mounted at opposite ends of the frame 16 centrally thereof and over a sprocket 26 mounted on a drive shaft 28 of a hydraulic motor M supported in the frame 16.

Admission of fluid to the hydraulic motor M of the illustrative work feed mechanism is controlled by a three-position solenoid valve SV1. In its central position (shown in the drawing) no fluid is admitted to the motor; if solenoid S1 (the right hand one in the drawing) is actuated, fluid is admitted from hydraulic pump P through line L1, the valve SV1 and line L2 to the left hand side of the motor M, fluid being exhausted from the right hand side of the motor through line L3, the valve SV1, line L4 and solenoid valve SV2 to tank. If, on the other hand, solenoid S2 is actuated fluid under pressure passes along line L3 to the right hand side of the motor while fluid is exhausted from the left hand side along line L2 to tank. Thus the work table 20 can be driven both towards and away from the press 10 along the upper surface of the frame 16 under the control of solenoid valve SV1.

When the work table 20 of the illustrative feed arrangement is caused to move in one direction along the frame, for example by fluid being admitted along line L2 to the left hand side of the motor M, the fluid, at full pressure from the pump P which is continuously operating, is bled off from the line L1 along line L5 and through pressure relief valve PV3 to a tank, this bleed gradually diminishing as the inertia of the system is overcome and the work table 20 accelerates up to full speed.

In order not to stop the work table 20 instantly when it has completed its indexing movement, but rather to reduce its speed gradually to a so-called "creep speed" prior to arresting its movement altogether, solenoid valve SV2 is operated, by acutation of solenoid S3, to connect line L4 to line L6 and pressure relief valve PV4 and fluid flow restrictor RV5, valve PV4 being effective by creating a build up of pressure on the exhaust side of the motor M, to cause fluid to be again bled off through line L5 and pressure relief valve PV3 until the speed of travel of the work table 20 is decelerated to a speed dictated by the setting of restrictor RV5, valve PV3 gradually opening to reduce the speed of the work table and valve PV4 gradually closing so that the exhausting fluid passes through restrictor RV5 to a tank.

When the work table 20 has completed its indexing movement solenoid valve SV1 is returned to its central position and the movement of the table is stopped instantly.

The illustrative work feed mechanism further comprises electrical control means for controlling, through solenoids S1, S2, S3, the drive imparted to the work table 20 by the hydraulic drive means, said control means comprising a photoelectric or inductive tooth detector having a transducer T mounted on the frame 16 in close proximity with the periphery of a toothed wheel 30 mounted on the drive shaft 28 of the motor M, the arrangement being such that pulses created by the passage of successive teeth of the wheel 30 past the transducer T are transmitted along wire TW4 to a transistorized batch counter device BC mounted on the frame of the illustrative work feed arrangement so as to be readily accessible to the operator. The counter device BC is pre-set so that a number of pulses have been transmitted thereto by rotation of the wheel 30, and thus during movement of the work table 20 along the surface of the frame 16, circuit W3 is made to energize solenoid S3 whereby the speed of the work table is reduced to creep speed. After a further number of predetermined pulses have been counted, solenoid S1 or S2 (connected to the batch counter device by circuit W1a or W2a respectively), depending upon which solenoid was energized initially to cause movement of the work table to be effected, is de-energized thus allowing valve SV1 to be returned to its central position and cause the movement of the work table to be arrested. At the same time a signal is transmitted through circuit W5 to a control box PC for the press to initiate an operating stroke of the press beam 14. Operation of the press takes place in the manner described in the aforementioned complete specification.

When the press beam 14 is returned to its uppermost position at the end of a cycle of operation of the press, a signal is transmitted through a circuit W6 to the counter device BC which is then zeroed for the next indexing operation of the illustrative work feed arrangement. At the same time circuit W1b or W2b is made to energize solenoid S1 or S2 respectively, depending upon which has previously been selected (according to the direction in which it is desired to move the work table 20), and thus to cause a further indexing movement of the work table to be initiated.

Conveniently in using the illustrative apparatus, the operator first locates and secures a selected die to the under-side of the press beam 14 and then sets the batch counter device BC according to the distance through which the work table 20 is to be indexed between successive cutting strokes of the beam, this distance being in turn determined by the width of the die. A lay of material to be cut is then laid on the work table 20 which at this time has been brought to a loading position and the illustrative apparatus is then ready for initiation of operation thereof. The operator merely presses an appropriate switch which causes the work table 20 to be moved to a starting position with a first portion of the lay of material beneath the press beam and thereafter cutting and indexing take place alternately without further participation by the operator who is thus left free to prepare a further lay of material to be cut in a subsequent operation of the illustrative apparatus.

Having thus described our invention, what we claim as new and desire to secure by Letters Patent of the United States is:

1. A press for cutting sheet material having a cutting bed, a platen supported for movement toward and away from said cutting bed, power means for operating said platen in cutting strokes to press cutting dies through sheet material supported on said bed, having in combination therewith, apparatus for feeding sheet material progressively to said press comprising
   (a) a work table mounted for movement of translation to feed sheet material carried thereon through said press,
   (b) power operated driving means for moving said table, said driving means having a drive shaft operatively connected to said table for effecting movement thereof in response to and in accordance with rotation of said shaft,
   (c) a toothed wheel carried on said shaft,
   (d) a tooth detector mounted in operative relation to said toothed wheel for response to the movement of the teeth thereof past a predetermined position,
   (e) means for causing the driving means to effect movement of the work table, and
   (f) control means responsive to said tooth detector for causing said driving means to interrupt the movement of said work table after a predetermined number of teeth have moved past said position.

2. Apparatus as defined in claim 1 and additionally comprising means controlled by said tooth detector for causing said driving means to operate at a reduced rate in response to the movement of a given number of teeth past said position, said given number being less than said predetermined number.

3. Apparatus as defined in claim 1 and additionally comprising means controlled by said tooth detector for causing the power means of said press to operate said platen to effect a cutting stroke in response to movement of said predetermined number of teeth past said position.

4. Apparatus as in claim 3 and additionally comprising means responsive to the return of said press platen to its rest position for initiating operation of the work table driving means in a subsequent feed step.

References Cited

UNITED STATES PATENTS

| | | | |
|---|---|---|---|
| 1,241,246 | 9/1917 | Payne | 83—222 X |
| 2,695,668 | 11/1954 | Roth | 83—222 |
| 2,902,005 | 9/1959 | Panissidi | 83—263 X |
| 3,357,288 | 12/1967 | Goodman et al. | 83—533 X |

ANDREW R. JUHASZ, *Primary Examiner.*

FRANK T. YOST, *Assistant Examiner.*

U.S. Cl. X.R.

83—276, 396, 533